UNITED STATES PATENT OFFICE.

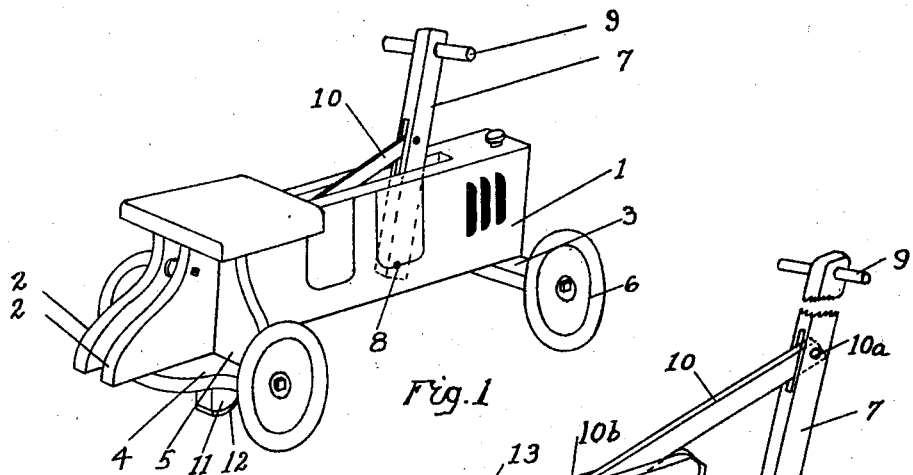
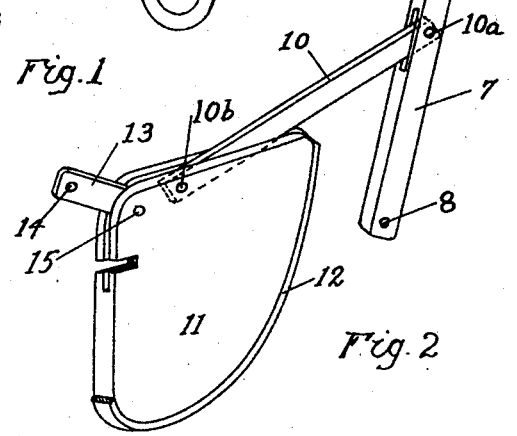
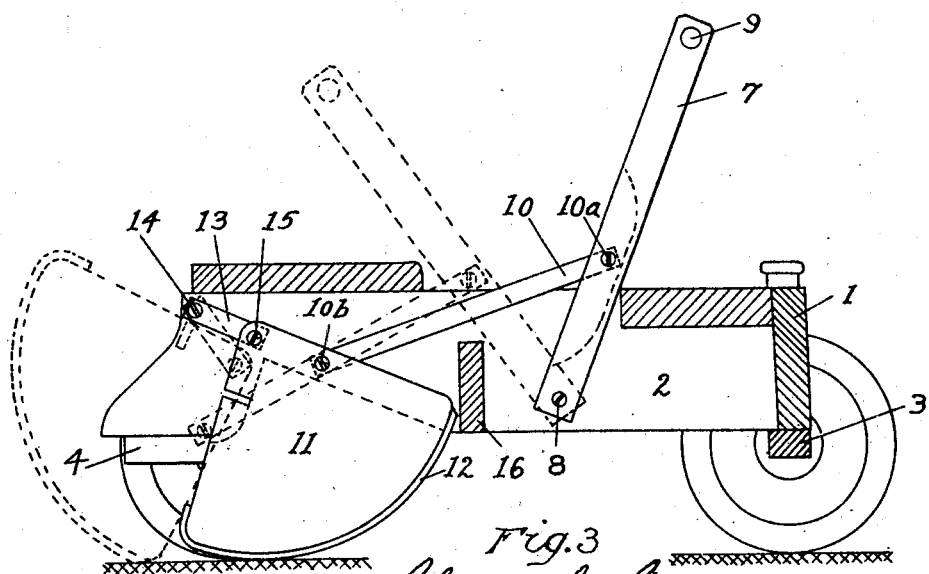

CLAUDE J. GORDON, OF SAGINAW, MICHIGAN.

TOY VEHICLE.

1,383,397.  Specification of Letters Patent.  Patented July 5, 1921.

Application filed May 7, 1920. Serial No. 379,488.

*To all whom it may concern:*

Be it known that I, CLAUDE J. GORDON, a citizen of the United States, residing at Saginaw, in the county of Saginaw and State of Michigan, have invented certain new and useful Improvements in Toy Vehicles; and I do hereby declare the following to be a full, clear, and exact description of the invention, such as will enable others skilled in the art to which it appertains to make and use the same.

This invention relates to toy vehicles for the use of children. The object of my improvement is to provide a vehicle of inexpensive and simple construction which may be propelled by the rider, the propelling mechanism adapted to impart a propelling force to the vehicle substantially uniform throughout the length of the stroke of the handle bar, the propelling mechanism adapted to lift clear of the ground on the return stroke, so as to offer no resistance to the forward movement of the vehicle.

My invention further consists in the devices shown and described and the equivalents thereof.

The invention is illustrated in the drawings, in which Figure 1 is a perspective view of the vehicle.

Fig. 2 is a detached view of the propelling mechanism.

Fig. 3 is a central longitudinal section showing in full lines and dotted lines respectively the forward and rearward positions of the handle bar and the propelling cam.

In the drawings 1 is the body of the vehicle, comprising a front part 2 and rearwardly extending parallel side members 2, 2 spaced apart.

3 is the front axle and 4 is the rear axle, preferably made in the form of a pair of horizontally disposed brackets, one at each side of the body and secured to one of the side members 2.

5 is a vertical stiffening rib for the axle.

The rear axle does not extend across the space between the side members 2, 2, leaving that space clear for the operation of the propelling cam, as will presently be described.

6 are the wheels and 7 is the hand-lever pivotally mounted between the side members 2, 2 by means of a bolt 8.

A handle bar 9 is carried by the hand-lever 7.

A thrust link 10 is pivoted at one end to the hand-lever 7 by means of a bolt $10^a$ and is likewise pivoted as at $10^b$, to the propelling cam 11.

12 is a leather, or equivalent, tread or liner for the working surface of the cam 11. 13 is a suspension link by which the cam 11 is freely suspended from the body 1, the cam and link 13 being located between the side members 2, 2.

14 is the upper pivot by which the link 13 is hung between the members 2, 2, and 15 is the lower pivot connecting the link 13 and the upper end of cam 11.

The upper part of the cam 11 is bifurcated, as shown in Fig. 2, to receive the link 13, and the end of thrust link 10.

Referring to Fig. 3, where the full lines indicate the forward position of the cam and the dotted lines its rearward position, it will be seen that the cam is freely suspended from its upper end by means of the link 13 and consequently can roll along the floor when the vehicle moves forward, until it reaches the position shown by dotted lines. When the rider is on the seat and the handle 7 is in the position shown in full lines, if the handle is pulled back, the cam 11 is pressed downward by a thrust transmitted through the link 10 against the resistance of pivot 15 and link 13, and the cam rolls along the floor while the vehicle moves forward. When the handle 7 is in its rearward position, as shown by the dotted lines and the cam and link 13 are in the corresponding positions, the vehicle will have moved forward a distance equal to approximately the periphery of the cam tread, and during that time a continuous force has been exerted between the vehicle and the ground, to propel the vehicle forward by an approximately uniform forward push of the cam against the ground.

The handle is then pushed quickly forward and since the link 13 is freely suspended, the cam lifts bodily and swings forward until it strikes a cross bar 16, which also acts as a stop to limit the forward movement of the cam. The cam then drops to the floor in the position shown by the full lines in Fig. 3 and is ready for the next working stroke. It will be noted that the cam being freely suspended by means of the link 13 has a pendulum-like movement from the pivot 15 and is also free to move bodily up and down because of its suspension from link 13, and pivot 14. Therefore the engagement of the cam and the floor is a positive engagement and the harder the handle 7 is pulled back, the more of the rider's weight will be lifted from the axles of the rear wheels and transmitted to the ground through the cam 11. Therefore, the harder the pull on the handle, the more firm will be the contact between the working face of cam 11 and the floor. For this reason it is possible for a very small child to propel the vehicle with considerable speed and without loss of energy through slippage between the propelling cam and the floor.

By the means above described, I have produced a toy vehicle which is inexpensive to construct, durable, and not likely to get out of order, and capable of being propelled at considerable speed with the expenditure of only a small amount of energy.

Having thus described my invention, what I claim and desire to secure by Letters Patent is:

1. In a vehicle of the class described, a wheeled body comprising side members spaced apart, a suspension link pivotally secured at one end to said body, a propelling cam pivoted at its upper end to the other end of said link, a thrust link pivoted to said cam, and means for actuating said thrust link, whereby to force said cam rearwardly and downwardly on the rearward stroke of said thrust link and to lift the cam forwardly and upwardly on the forward stroke.

2. In a vehicle of the class described, a wheeled body comprising side members spaced apart, a suspension link pivotally secured at its upper end to said body, a propelling cam pivoted at its upper end to the other end of said link, a thrust link pivoted at its forward end to said cam, a handle pivoted at its lower end to said body and pivoted near its upper end to the forward end of said thrust link, for the purposes set forth.

3. In a vehicle of the class described, a wheeled body comprising side members spaced apart, a suspension link pivotally secured at its upper end to said body at a point beneath the seat, a propelling cam also located beneath the seat and pivoted at its upper end to the other end of said link, a thrust link pivoted at its forward end to said cam, a handle pivoted at its lower end to said body and pivoted near its upper end to the forward end of said thrust link, for the purposes set forth.

In testimony whereof I affix my signature.

CLAUDE J. GORDON.